Nov. 4, 1952     E. B. ANNIS     2,616,716
TRACTOR REARING OVER PREVENTER
Filed Aug. 26, 1950     2 SHEETS—SHEET 1
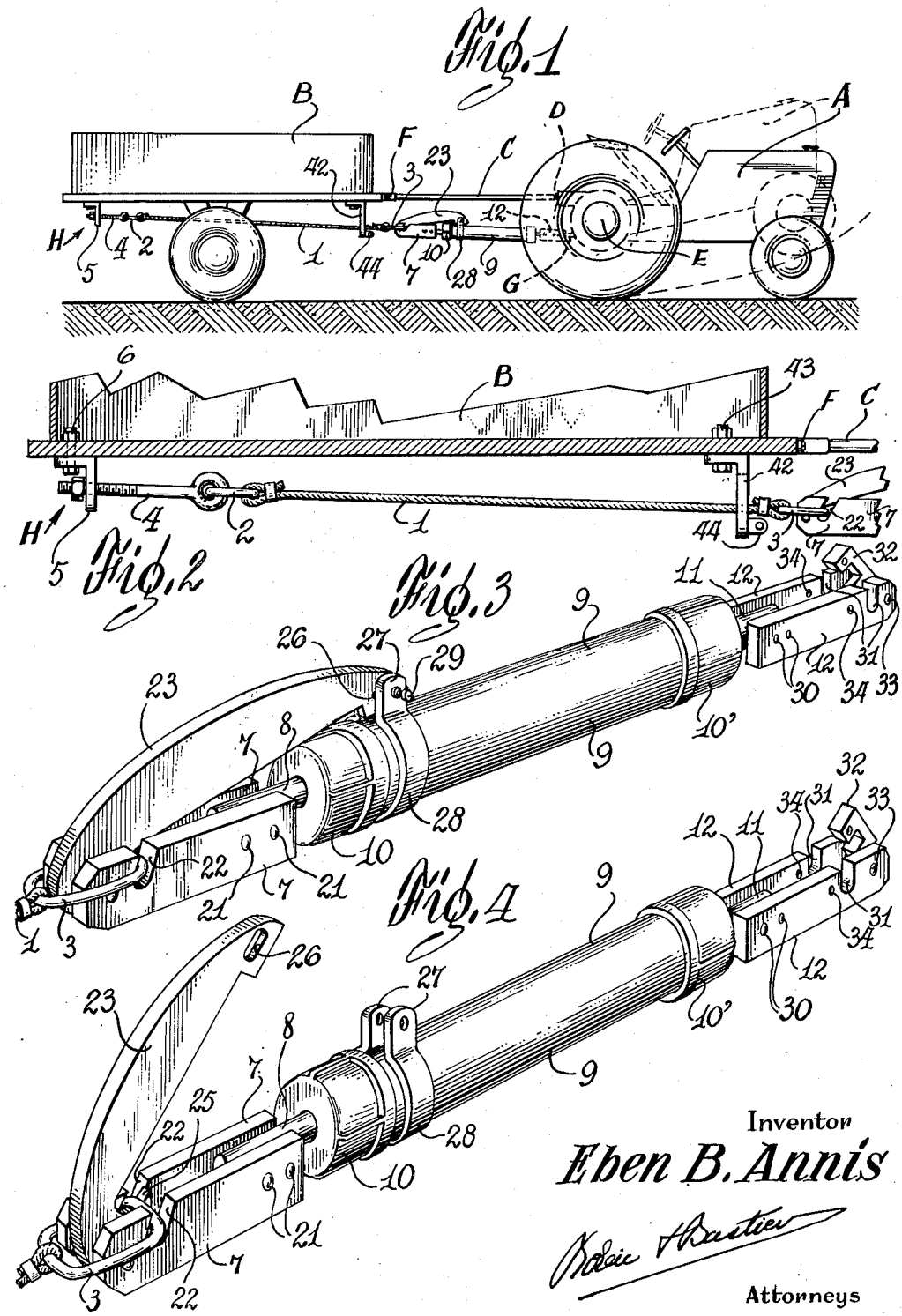
Inventor
*Eben B. Annis*
Attorneys

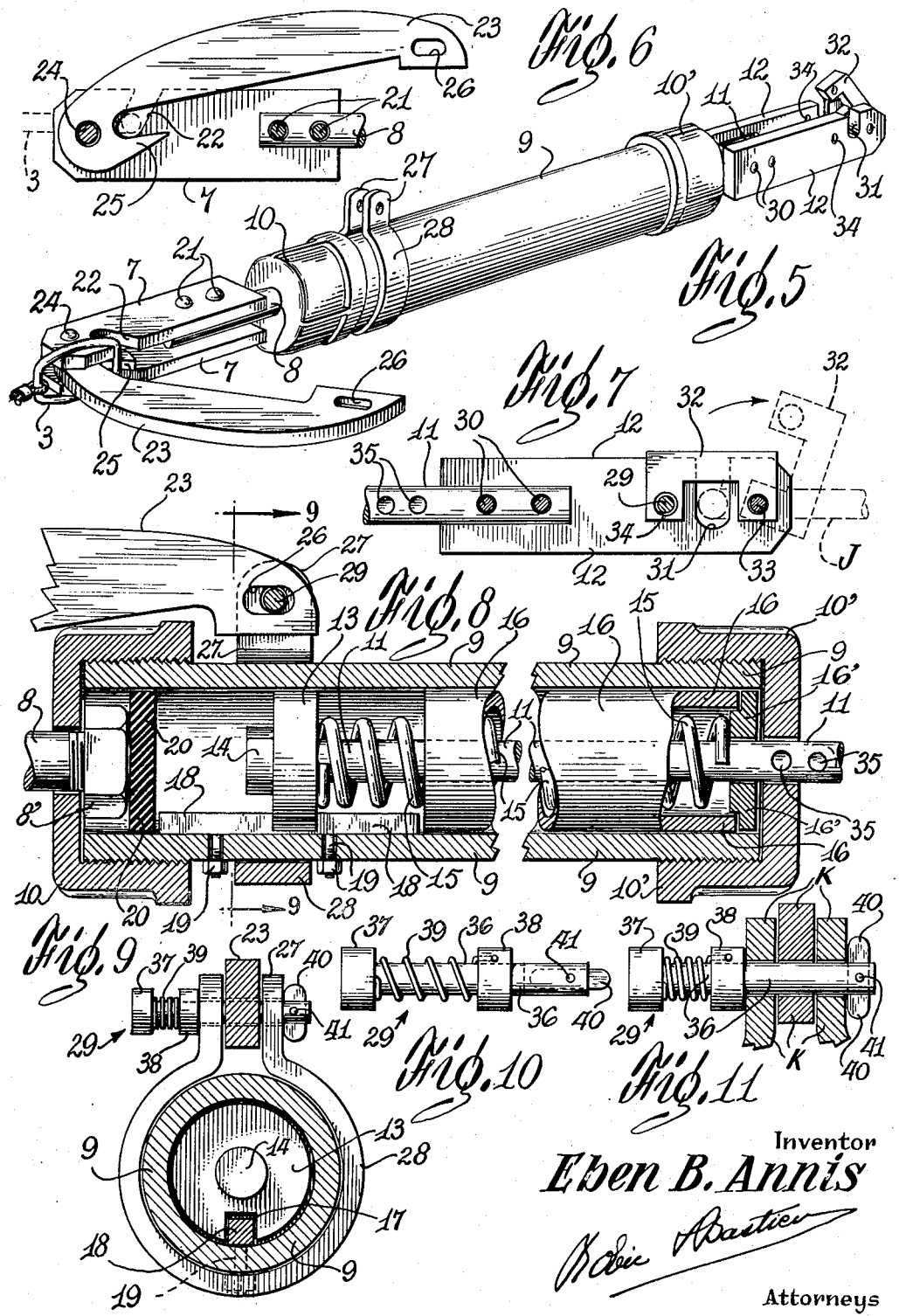

Patented Nov. 4, 1952

2,616,716

UNITED STATES PATENT OFFICE 2,616,716

TRACTOR REARING OVER PREVENTER

Eben B. Annis, South Stukeley, Quebec, Canada

Application August 26, 1950, Serial No. 181,671

5 Claims. (Cl. 280—33.9)

The present invention relates to a tractor rearing over preventer and more particularly to an auxiliary device for connection between a tractor and a load in order to prevent overturning or rearing over of said tractor.

Persons using tractors found on farms, may easily become involved in an accident resulting from the overturning of the tractor, when pulling a heavy load.

Overturning of farm tractors happen because the heavy load to be pulled is linked to the tractor either at a point disposed above the rear axle of the same, in which case the pull exerted tends to overturn the tractor, or more generally at a point disposed below said axle or underneath the tractor in which case there is provided only a small couple which, together with the weight of the forward portion of the tractor, is often insufficient for opposing the overturning couple exerted by the driving mechanism of the tractor at the rear traction wheels of the same.

It is very difficult to increase said opposing couple because a certain minimum clearance must be maintained between the ground and the bottom of the tractor in order to go over obstacles.

Furthermore, it is not possible to connect both tractor and load so as to form a rigid unit, although such a connection would prevent rearing over, because a flexible joint must be maintained to negotiate uneven ground.

According to the present invention, the load is pulled by the tractor in the usual manner: it is connected thereto by means of a conventional rigid draw bar to a point disposed above or below the rear axle of said tractor. The invention is characterised by a rearing over preventer in the form of an auxiliary tension unit connected between the tractor and the load and extending below said rigid draw bar.

Thus, when the tractor tends to overturn, the draw bar is brought into compression while the rearing over preventer is put into tension, thereby forming with the load and tractor a nondeformable arrangement which will necessarily overcome the overturning couple and maintain the tractor in proper position.

Therefore, the main object of the present invention, is the provision of a tractor rearing over preventer for attachment to a tractor and to a load to be pulled, which will completely prevent overturning of said tractor.

Another important object, according to the present invention, is the provision of a rearing over preventer adapted to be used in combination with a tractor pulling a load by means of a rigid draw bar connecting the tractor and the load for traction and comprising an auxiliary tension unit extending below said draw bar and connected to said tractor at a point disposed below the connection level of said draw bar and preferably at the bottom of the rear axle housing, the other end of said rearing over preventer being connected to said load at any desired point but preferably as far back as possible.

Still another important object of the present invention is the provision of a rearing over preventer of the character previously described having resilient means for imparting to the same a suitable elasticity within certain limits and adjustable means for adjusting its normal tension and said limits.

Yet another important object of the present invention is the provision of a tractor rearing over preventer of the character above mentioned which is of rugged construction and yet very flexible in use to provide an easily manageable connection between the load and the tractor, said rearing over preventer being further adapted to be used in conjunction with tractors of various makes.

The foregoing and other important objects of the present invention will become more apparent during the following disclosure and by referring to the drawings in which:

Figure 1 is a somewhat schematic representation of a tractor and of a load drawn thereby showing the position of the rearing over preventer according to the present invention;

Figure 2 is a fractional sectional elevation of the rear part of the rearing over preventer according to the invention, showing how it is connected to the load;

Figure 3 is a perspective view of the tension maintaining cylinder according to the invention, together with associated parts; and more particularly showing the tensioning lever in closed position;

Figure 4 is a view similar to that of Figure 3 showing the tensioning lever in partly open position;

Figure 5 is a view similar to that of Figure 4 showing how the tensioning lever may be rotated to permit easy removal and insertion of the cable according to the invention;

Figure 6 is a detailed sectional elevation of the cable tensioning arrangement;

Figure 7 is a detailed sectional elevation of the linking bars connecting the tension maintaining cylinder to the tractor;

Figure 8 is a longitudinal section of the tension maintaining cylinder according to the invention;

Figure 9 is a cross-section along line 9—9 of Figure 8;

Figure 10 is an elevation of a preferred embodiment of a locking pin for locking in position various elements of the device according to the invention; and Figure 11 is a view of said locking pin in operative position, the locked parts being shown in cross-section.

Referring now more particularly to the drawings in which like reference characters indicate like elements throughout, the letter A indicates a tractor of any conventional design for farm use, the letter B indicates the load drawn by the tractor A, said load taking the form of a four wheeled vehicle, a two wheeled vehicle, a sleigh or like vehicular device.

According to the present invention, it is essential that the load be hingedly connected to the tractor A by means of a rigid draw bar C. The connection point D of the latter and of the tractor may be disposed at a level above or below the rear axle E of said tractor.

The connection D will consist in any conventional flexible joint for instance a loop and hook unit to afford flexibility for turning movements and when going over bumps and holes, while the other end of the draw bar C may be rigidly dependent from the load or vehicle B as at F, or flexibly connected therewith as by a hinge connection, depending on the type of vehicle being pulled. The only essential requirement being that the draw bar C itself be rigid in order to be capable of transmitting a compression thrust from the tractor A to the load B.

The auxiliary device or tension unit, according to the invention, is connected to the tractor A at a point G disposed below the connection D of the draw bar C at a level equal to, but preferably lower than the level of the rear driving axle E of the tractor A such as at the bottom of the rear axle housing or some other given point. The other end of said tension unit, which extends preferably in the vertical plane containing the draw bar C, is connected at any suitable point H to the load B, preferably positioned at the rear of the load B for better stability of the tractor and load arrangement.

The rearing over preventer, according to the invention, comprises in practice a flexible cable, a tension maintaining unit and suitable fastening and tensioning means. The cable 1 is terminated by two loops or metal rings 2 and 3, the rear loop 2 connected to an eye bolt 4 which is bolted to a right angle bracket 5 itself secured to the vehicular load B by means of the bolt and nut 6 to constitute the connection joint H. The loop 3 removably engages the cable linking bars 7. The cable linking bars 7 themselves are bolted, or otherwise secured, to a link rod 8 rotatively connected to the cylinder or tubular casing 9 of the tension maintaining unit by means of the nut 8' bearing against the bored end cap 10 threadedly engaging said casing 9. The other end of the casing 9 is closed by a bored cap 10' through which protrudes a second rod 11 bolted or otherwise secured to the tractor linking bars 12 which are provided with suitable hooking means for attachment to the tractor at the point G.

As shown in Figure 8, the inner end of the rod 11 threadedly receives a collar nut 13 locked in place by means of a check nut 14, said collar nut 13 serving to keep the coil spring 15, under tension by abutting one end of the same, the other end of which abuts a rabbeted washer 16' disposed inside the tubular casing 9 and abutting the forward cap 10'. The rod 11 and spring 15 extends within and across an inner tube 16 coaxial with the casing 9 and engaging at one end the rabbet of the washer 16'. This tube serves to limit the course of the rod 11, the collar nut 13 abutting the same at its limit outward position.

To prevent rotation of the rod 11 with respect to the casing 9, a keyway 17 is formed at the periphery of the collar nut 13, itself rigidly secured to the rod 11, said keyway slidably receiving a key 18 longitudinally extending within the casing 9 and secured thereto by means of bolts and nuts 19.

A suitable rubber disc 20 is disposed at the inner end of the link rod 8 to receive and absorb the impact of the suddenly released rod 11 upon disconnecting the preventer according to the invention.

The casing 9, the rod 11, the spring 15 and other associated elements form a tension maintaining unit which will maintain the rearing over preventer under tension whether the tractor is in movement or stationary.

From the foregoing structure it is seen that the tractor linking bars 12 and rigidly dependent rod 11 are longitudinally displaceable relative to the tubular casing 9 being spring urged towards said tubular casing 9.

When the tractor and the load are on flat ground, the rearing over preventer, according to the invention, is adjusted as to its normal tension by means of the nut retaining the eye bolt 4 to the bracket 5 at H, using as a reference equally spaced index marks 35 formed on rod 11 along its portion protruding from the cap 10'.

In this way, the outward limit of the course of the rod 11 may be adjusted so as to determine the maximum height, the front wheels of the tractor will be allowed to reach for negotiating uneven ground.

The cable linking bars 7 consist in elongated substantially flat elements secured to the rod 8 on both sides thereof by means of bolts 21, said bars being disposed in spaced parallel relationship and being provided along their upper edge with the notches 22 inclined toward their free ends in such a way as to retain the ring 3 of the cable 1. A tensioning lever 23 is pivoted at 24 to the free ends of and between said cable linking bars 7 in order to engage the ring 3 of the cable 1 for tensioning and guiding the same into the notches 22. This lever 23 is preferably provided adjacent its pivot with a hook projection 25 for engaging and withdrawing the ring 3 from the notches 22 when the tensioning lever is opened.

The free end of the tensioning lever 23 is provided with a slot 26 and is adapted to engage, when the lever is in closed position, the two spaced upstanding ears 27 of a strap 28 enclosing the tubular casing 9. These upstanding ears 27 are perforated so that a locking pin 29 may be inserted therethrough and through the slot 26 of the lever 23 in order to lock the latter in closed position as shown in Figure 3.

Because the rearing over preventer, according to the invention, extends normally directly below the draw bar C, the tensioning lever will be opened or closed by rotating the cable linking bars 7 and associated rod 8 preferably a quarter of a turn. Thus a quick and easy attachment of the cable 1 to the cable linking bars 7 is achieved.

The tractor linking bars 12 are secured by means of bolts 30 to the rod 11 and are provided at their upper edge with notches 31 extending at right angles to the longitudinal axis of said bars for receiving, as shown in Figure 7, any conventional hooking member J secured to the tractor A. This member J is locked to the tractor linking bars 12 by means of a U-shaped catch member 32 pivoted at 33 to and between said bars 12 and having a hole at its free end to register with holes 34 made in the bars 12 in order to receive and be locked by means of a locking pin 29.

The locking pins 29 are preferably constructed in the manner as shown in Figures 9, 10 and 11; they comprise a shaft 36, a head 37 threadily engaging said shaft 36 at one end thereof, a ring or collar 38 slidably mounted on the shaft 36 and spring urged by means of the coil spring 39. The two ends of the shaft are slitted to receive at one end the spring 39 and at the other end a blade 40 pivoted thereto at 41 intermediate its ends.

The other end of spring 39 is bent to extend through a hole made in collar 38.

To insert the locking pin 29 according to this embodiment, the blade 40 is positioned, as shown in Figure 10, longitudinally of the body 36 and then inserted through the elements K, after which the blade is turned a quarter of a turn, as shown in Figure 11, thereby locking the pin 29 in position. The spring 39 will press the collar 38 against the locked elements K which in turn will be pressed against the blade 40. Thus a secure lock is achieved.

When the rearing over preventer, according to the invention, is secured to the vehicular load B at a rear point H, such as shown in Figure 1, it is preferable to guide the forward end of the cable 1 by means of a suitable bracket 42, such as shown in Figure 2, which may be secured to the load at the forward end thereof as by means of bolt and nut 43. This bracket 42 has preferably the form of an open yoke, the free end of the legs of which being provided with projections 44 bored to receive a locking pin such as the locking pin 29 when the cable extends through the yoke. This arrangement will maintain the forward part of the rearing over preventer in a plane substantially the same as the vertical plane containing the draw bar C even during turning movements of the tractor.

It has been seen that the tractor rearing over preventer, according to the invention, is somewhat extensible, so as to allow a certain flexibility of movement of the tractor in a vertical plane relatively to the load B for negotiating uneven ground. But the maximum extension of the auxiliary unit will be adjusted in such a manner as to always prevent the vertical rotation of the tractor A about its rear axle E to such an extent which would cause overturning of said tractor.

By referring to Figure 1, it will be readily appreciated that, when the tractor rotates in a counterclockwise direction about its axle E to such an extent that the preventer attains its limit extent, the draw bar C will be subjected to a compression stress while the preventer, according to the invention, will be subjected to a tension stress, the combined action of both stresses resulting in a couple at the rear axle housing of the tractor opposing the overturning couple which is caused at the rear axle E by the transmission of power to the same.

It has been found in practice that with the preventer, according to the present invention, overturning of the tractor is completely prevented and that the motor of the tractor A will stall or the rear wheels spin before said overturning action occurs.

The device, according to the present invention, has therefore the great advantage of completely eliminating an appreciable source of tractor accidents.

Moreover, the present device has the advantage of permitting the pulling of a heavy load to the full capacity of the tractor. It will also dispense with the usual practice of weighting the tractor to overcome its overturning tendency: this is so much dead weight dispensed with.

Another feature of the present device is that it permits the even loading of a two wheel cart or of a sleigh with only two runners which is not possible when using the draw bar alone in which case the load has to be placed mainly behind the wheels or runners.

While a preferred embodiment according to the present invention has been illustrated and described, it is understood that various modifications may be resorted to without departing from the spirit and scope of the appended claims.

What I claim is:

1. A device of the character described for connecting a tractor and a vehicular load linked by a one-unit rigid draw bar capable of being submitted to both tension and compression stresses and normally transmitting said stresses between said load and tractor, said draw bar being hingedly fastened to the tractor at a point near the level of the driving axle of said tractor, comprising a flexible elongated member, a tension maintaining unit, attachment means to removably connect one end of said flexible member and said unit, and hooking means on said load and said tractor to attach thereto the outer end of said flexible member and of said tension maintaining unit respectively, said hooking means on the tractor being disposed at a level spaced from and below the connection level of said draw bar to said tractor, said tension maintaining unit comprising spring means, two telescoping members inwardly urged by said spring means, and stop means on said telescopic members to limit their outward movement, said attachment means comprising a tensioning lever, notched bars to which said lever is pivoted, said bars secured to one of said telescopic members, said lever engaging and tensioning said flexible elongated member and guiding the same into said notches.

2. A device of the character described for connecting a tractor and a vehicular load linked by a one-unit rigid draw bar capable of being submitted to both tension and compression stresses and normally carrying all the stress between said tractor and load, said draw bar being hingedly fastened to the tractor at a point near the level of the driving axle of said tractor, comprising a flexible elongated member, a tension maintaining unit, attachment means to removably connect one end of said flexible member and said unit, and hooking means on said load and said tractor to attach thereto the outer end of said flexible member and tension maintaining unit respectively, said hooking means on the tractor being disposed at a level spaced from and below the connection level of said draw bar to said tractor, said tension maintaining unit comprising a tubular casing, an inner tube disposed within said casing, a first rod slidable within said tube and said casing, and protruding out of the latter, a collar fixed to the inner end of said first rod for abutting said inner tube, a coil spring extending through said inner tube and surrounding said first rod between said collar and one end of said casing to urge said first rod inwardly of said tubular casing, and a second rod rotatively connected to the outer end of said casing, said attachment means comprising a tensioning lever, notched bars to which said lever is pivoted, said bars being secured to said second rod, said lever engaging and tensioning said flexible elongated member and guiding the same into said notches.

3. A device as claimed in claim 2 wherein the outer end of said first rod protruding from said casing is provided with a plurality of index marks as a reference for adjusting the course of said rod relative to said casing.

4. A device as claimed in claim 3 wherein said flexible member is a metal cable.

5. A device as claimed in claim 2 further including means to lock said tensioning lever in closed position, said means comprising apertured ears mounted on said casing, the outer end of said lever having an aperture registering with the apertures of said ears when said lever is in closed position, and a locking pin adapted to pass through said registering apertures of said lever and said ears, said locking pin consisting of a bolt having a head at one end and having its other end slit, a blade pivoted intermediate its ends within said slit, a collar slidable on said bolt and a coil spring surrounding said bolt between said head and collar to urge the latter away from said head.

EBEN B. ANNIS.

REFERENCES CITED

The following references are of record in the file of this patent:

UNITED STATES PATENTS

| Number | Name | Date |
|---|---|---|
| 1,414,343 | Doe | May 2, 1922 |
| 1,467,872 | Mitchell | Sept. 11, 1923 |
| 1,795,719 | Hardison | Mar. 10, 1931 |
| 2,064,615 | Kuchar | Dec. 15, 1936 |
| 2,356,481 | Thornhill | Aug. 22, 1944 |
| 2,549,814 | Hume | Apr. 24, 1951 |

FOREIGN PATENTS

| Number | Country | Date |
|---|---|---|
| 489,910 | France | Mar. 22, 1919 |